United States Patent
Eckel, Jr. et al.

[11] Patent Number: 5,953,155
[45] Date of Patent: Sep. 14, 1999

[54] OPTICAL SYSTEM

[75] Inventors: Robert A. Eckel, Jr., Andover, Mass.; Michael E. Couture, Litchfield, N.H.

[73] Assignee: Raytheon Company, Lexington, Mass.

[21] Appl. No.: 08/801,692

[22] Filed: Feb. 19, 1997

[51] Int. Cl.[6] .......................... G03B 13/06; G02B 17/00; G02B 23/00
[52] U.S. Cl. .......................... 359/432; 359/365; 359/421
[58] Field of Search .................... 359/364–366, 359/399, 402–403, 420–422, 432, 726–732, 856–861; 250/208.2, 208.6

[56] References Cited

U.S. PATENT DOCUMENTS

| | | | |
|---|---|---|---|
| 4,354,742 | 10/1982 | Abel et al. | 359/729 |
| 4,366,377 | 12/1982 | Notthopp et al. | 250/208.2 |
| 4,877,347 | 10/1989 | Gibbons et al. | 359/421 |
| 5,113,281 | 5/1992 | Mandelboum et al. | 359/365 |
| 5,229,880 | 7/1993 | Spencer et al. | 359/353 |

FOREIGN PATENT DOCUMENTS

| | | | |
|---|---|---|---|
| 0 145 845 | 6/1985 | European Pat. Off. | |
| 1552139 | 11/1968 | France | 359/366 |
| 2 082 789 | 3/1982 | United Kingdom . | |

*Primary Examiner*—Thong Nguyen
*Attorney, Agent, or Firm*—Fish & Richardson P.C.

[57] ABSTRACT

An optical system having a selected one of a pair of fields of view. The optical system includes a primary reflector; a secondary reflector; a refractive optical system; and a drive. The drive orients the secondary reflector to a first region in optical alignment with the primary reflector to provide the optical system with one of the pair of fields of view and for reorienting the secondary reflector to a second region out of optical alignment with the primary reflector and orienting the refractive optical system at the first region to provide a refractive optical system with a second one of the pair of fields of view. The optical system includes a detector and a second refractive optical system disposed between the first region and the detector. The detector comprises an array of detector elements. A processor is provided for processing energy from pixels formed by plurality of detector elements having a smaller area when the energy is directed through the secondary reflector than when the energy is directed through the first-mentioned refractive optical system. The secondary reflector and the first-mentioned refractive optical system are mounted to a common support and the drive rotates the support to orientated and reorient the secondary reflector.

8 Claims, 12 Drawing Sheets

OPTICAL SYSTEM

This invention was made with Government support under Contract No. DAAH01-94-C-R166 awarded by the Department of the Army. The Government has certain rights in this invention.

BACKGROUND OF THE INVENTION

This invention relates generally to optical systems and more particularly to optical systems adapted to provide either a relatively wide field of view or relatively narrow field of view within a relatively small packaging volume, i.e., in the order of less than 100 cubic inches.

As is known in the art, optical systems are used in a wide range of applications from cameras to missile system seekers. In a missile system application, the optical system is disposed in front of a detector, such as an infrared detector, for focusing infrared energy from a target onto the detector. In some systems, the optical system is required to have a different field of view in different phases of the missile's flight. Further, because of the relatively small space provided within the missile, packaging constraints limit the achievable resolutions and fields of view attainable with many optical systems. High resolution infrared systems in combination with large field of view requirements force large apertures and focal lengths which are not consistent with small packaging constraints.

Figure 1:
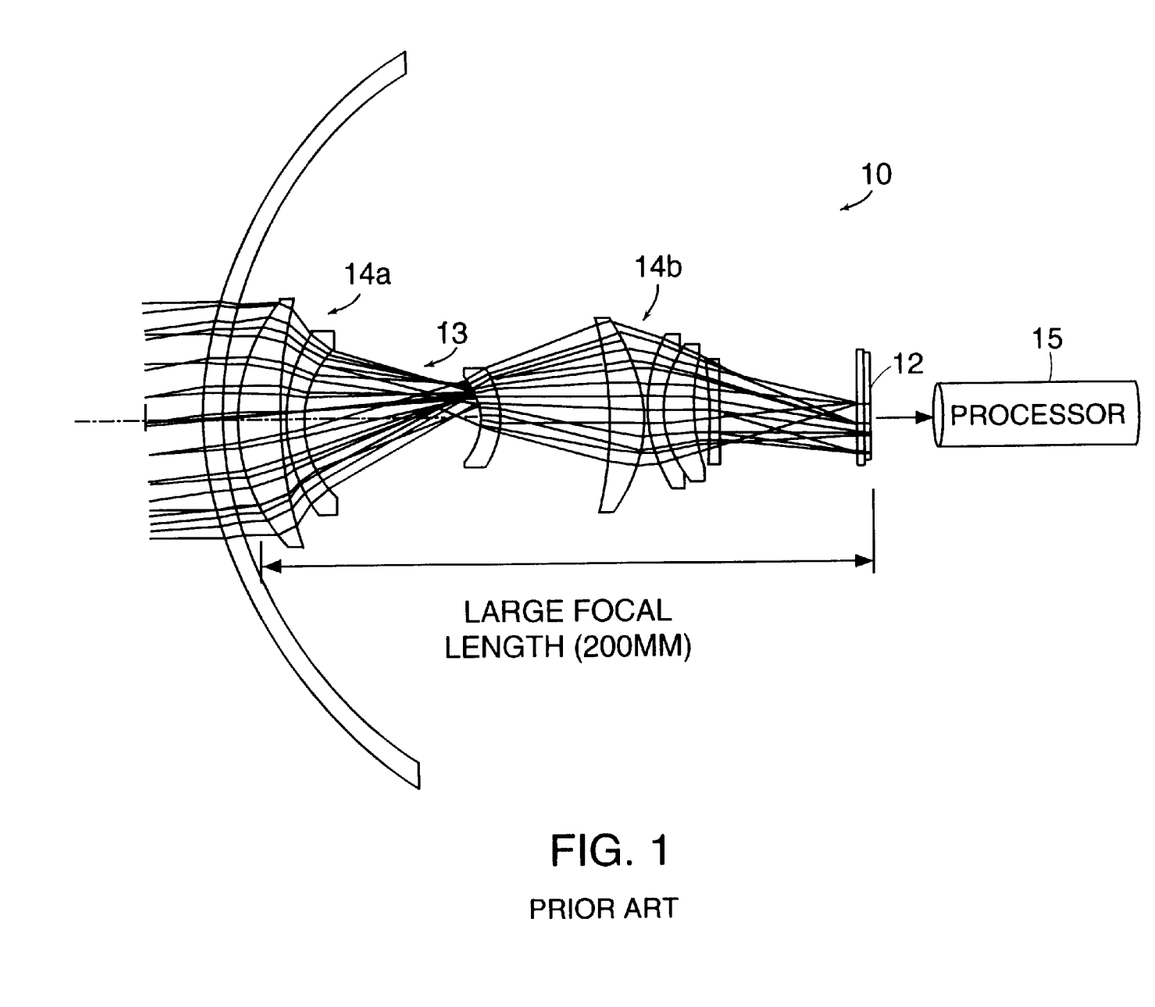
FIG. 1 is a diagrammatical sketch of a refractive optical system according to the PRIOR ART adapted to provide a relatively narrow field of view with high resolution.

For example, in one application a four to one change in field of view is required. Referring to FIG. 1, a conventional high resolution refractive optical system 10 is shown for directing energy onto a detector 12, here a focal plane array of detector elements for processing by a processor 15. Here, the focal length of the optical system 10 shown in FIG. 1 is 200 millimeters (mm). The refractive optical system 10 shown in FIG. 1 has two sets 14a, 14b of refractive lenses with a region 13 therebetween.

Figure 2:
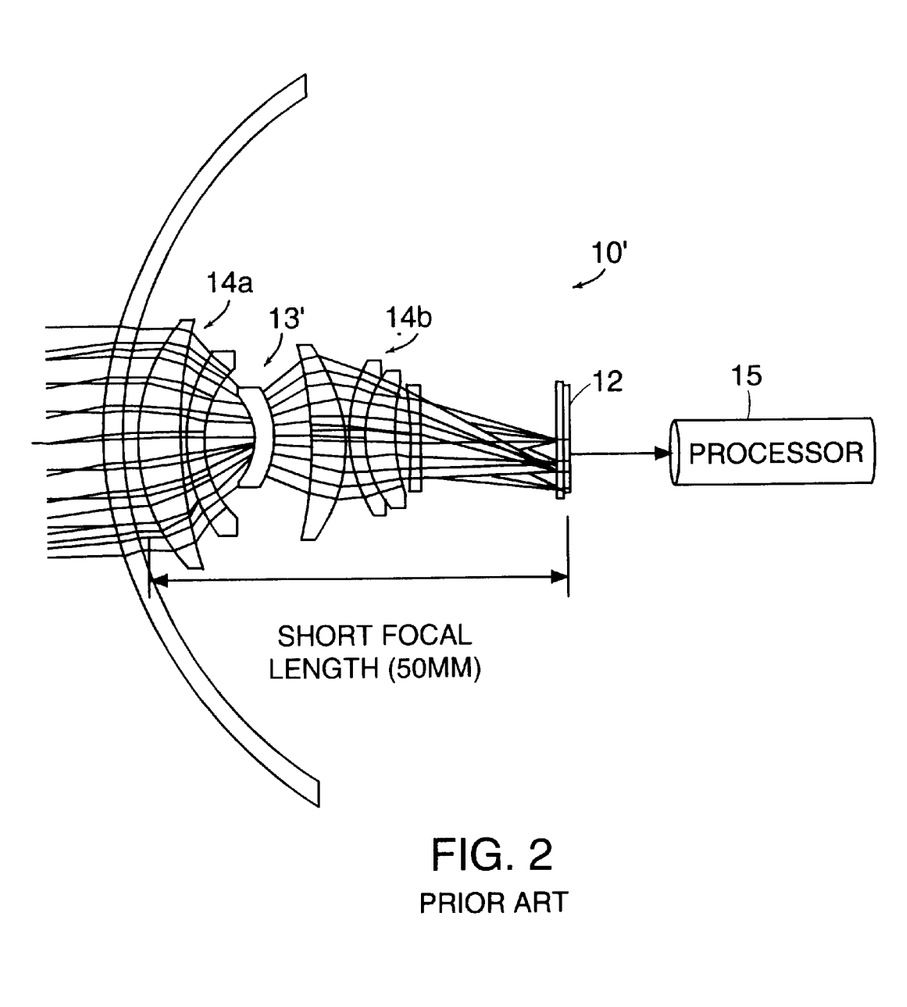
FIG. 2 is a diagrammatical sketch of a refractive optical system according to the PRIOR ART, such as that shown in FIG. 1, configured to provide a relatively wide field of view with low resolution.

Referring now to FIG. 2, the system 10 is shown shortened by moving lens set 14b closer to lens set 14a. Here, the focal length is 50 mm and provides a larger field of view optical system 10'. It is first noted that the system 10' has a lower resolution that the optical system 10 (FIG. 1 ). It is also noted that in region 13' of optical system 10' (FIG. 2) the ray angles are steeper and of larger width than in region 13 (FIG. 1) due to the four to one reduction in focal length. Further, an additional constraint unique to infrared imaging systems is the placement of the optics aperture stop within the cooling dewar volume to reduce extraneous background radiation thereby improving seeker sensitivity. Given this constraint, it becomes extremely desirable to utilize a re-imaging optics configuration to prevent very large optics aperture requirements.

Figure 3:
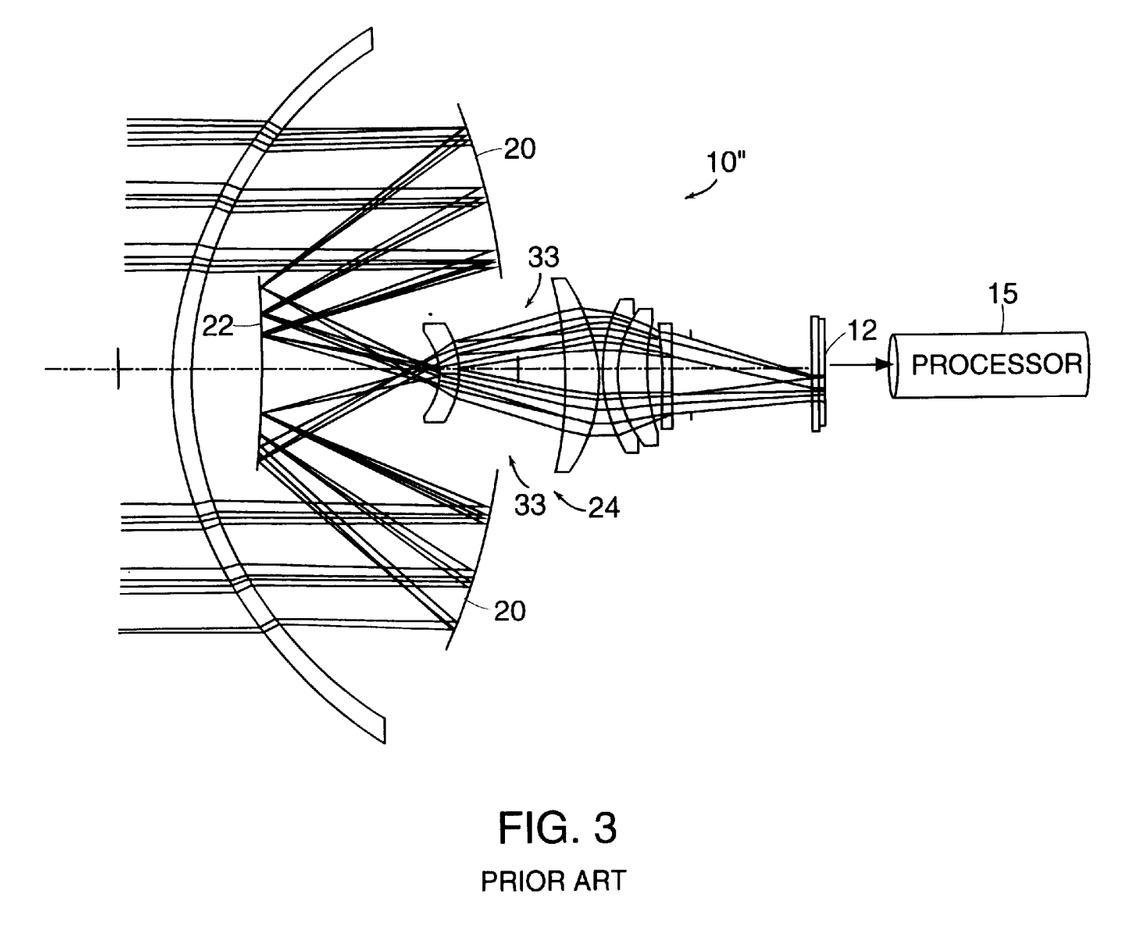
FIG. 3 is a diagrammatical sketch of a catadioptric optical system according to the PRIOR ART in a length half the length of the optical system of FIG. 1 and adapted to provide the same relatively narrow field of view with high resolution as that provided by the optical system of FIG. 1.
Figure 4:
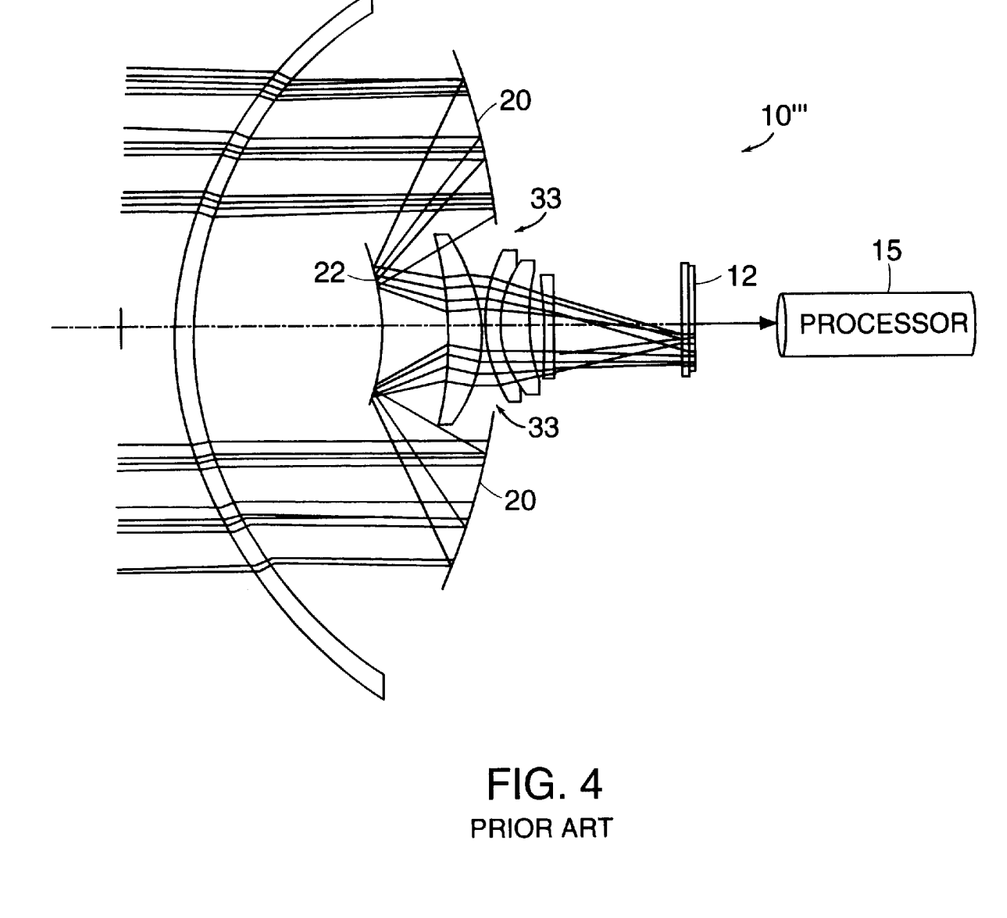
FIG. 4 is a diagrammatical sketch of a theoretical catadioptric optical system according to the PRIOR ART, such as that shown in FIG. 3, adapted to provide a relatively wide field of view with low resolution.

Referring now to FIG. 3, a conventional high resolution catadioptric optical system 10" is shown. System 10" includes a Cassegrainian optical arrangement having a primary reflector 20 and a secondary reflector 22. The optical system 10" includes a refractive optical system 24 and the detector 12, here a focal plane array of detector elements. The primary reflector 20, secondary reflector 22 and refractive optical system 24 are arranged to direct energy to the detector 12. Thus, the system 10" is a high resolution catadioptric optical system with a compressed mechanical length of half the focal length of the optical system 10 shown in FIG. 1. Referring now to FIG. 4, the optical system 10‴ (FIG. 3) is shown with the secondary reflector 22 moved rearward closer to the refractive optical system 24. The resulting optical system 10‴ has theoretically a focal length of 50 mm and is one fourth in length as compared to the length of system 10" (FIG. 3). However, it is noted that there is increased blockage in the rays and the local f# between the reflectors is thereby reduced resulting in a design which is not practical.

In summary, with a system required packaging length less than the focal length of the optical system, a refractive, high resolution, optical system is impractical (FIG. 1), while a catadioptric system (FIG. 3) may be used. When a focal length of one-fourth is now required, movement of the refractive optical system portion of the catadioptric system towards the secondary reflector results in an impractical design (FIG. 4) because of a large increased blockage of incoming light and a severe growth in required diameter of the primary reflector. Further, the resulting optical system (FIG. 4) will present a large change in effective f# because there is a large change in the amount of energy intercepted by (i.e., impinging on) the detector due to increased blockage.

SUMMARY OF THE INVENTION

In accordance with the invention, an optical system is provided having a selected one of a pair of fields of view. The optical system includes a primary reflector; a secondary reflector; a refractive optical system; and a drive mechanism for orienting the secondary reflector to a first region in optical alignment with the primary reflector to provide the optical system with one of the pair of fields of view and for reorienting the secondary reflector to a second region out of optical alignment with the primary reflector and orienting the refractive optical system at said first region to provide a refractive optical system with a second one of the pair of fields of view.

In accordance with another feature of the invention, the optical system includes a detector and a second refractive optical system disposed between said first region and the detector.

In accordance with still another feature of the invention, the detector comprises an array of detector elements. A processor is provided for processing energy directed through either the secondary reflector or the first-mentioned refractive optical system onto the plurality of detector elements. The processor processing energy from pixels formed by plurality of detector elements having a smaller area when the energy is directed through the secondary reflector than when the energy is directed through the first-mentioned refractive optical system.

In a preferred embodiment of the invention, the secondary reflector and the first-mentioned refractive optical system are mounted to a common support and a motor gimbals the support about the primary reflector to orient, and reorient, the secondary reflector.

BRIEF DESCRIPTION OF THE DRAWING

Other features of the invention, as well as the invention itself, will become more readily apparent from the following detailed description taken together with the accompanying drawings, in which.

DESCRIPTION OF THE PREFERRED EMBODIMENTS

Figure 5A:
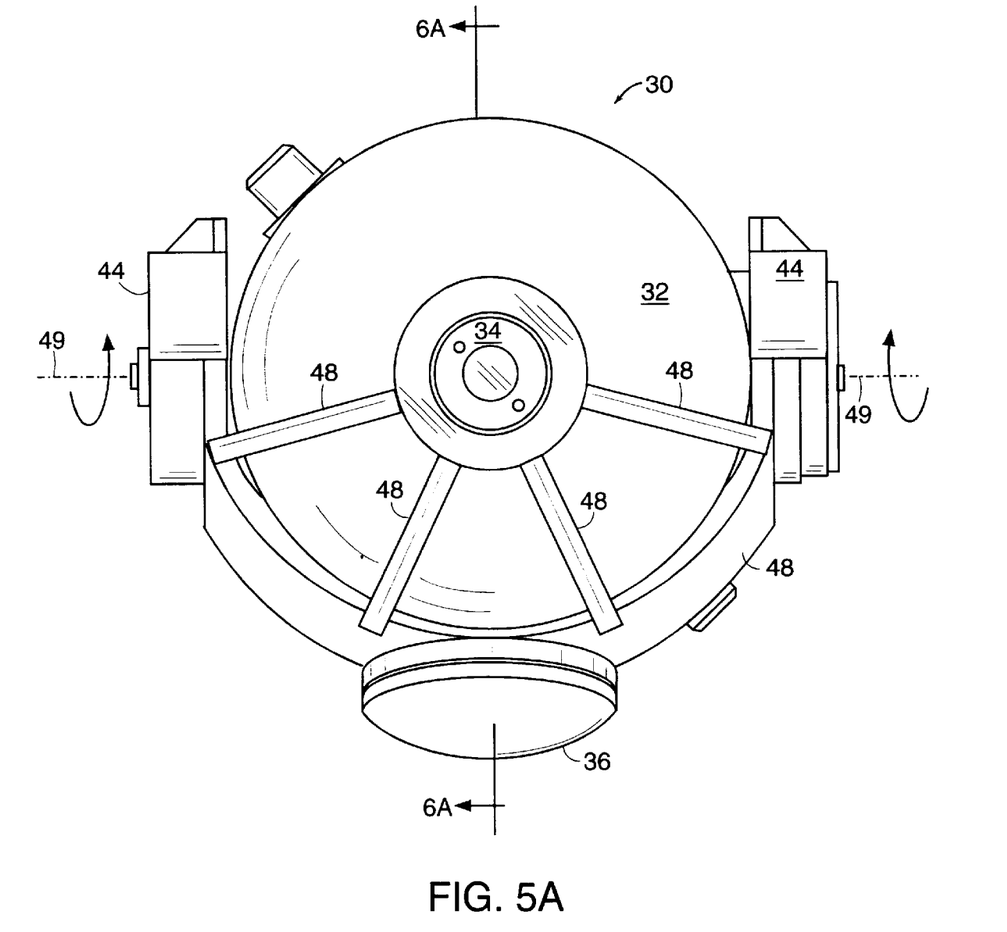
FIG. 5A is a simplified, front view sketch showing an optical system according to the invention when configured to provide a narrow field of view.
Figure 5B:
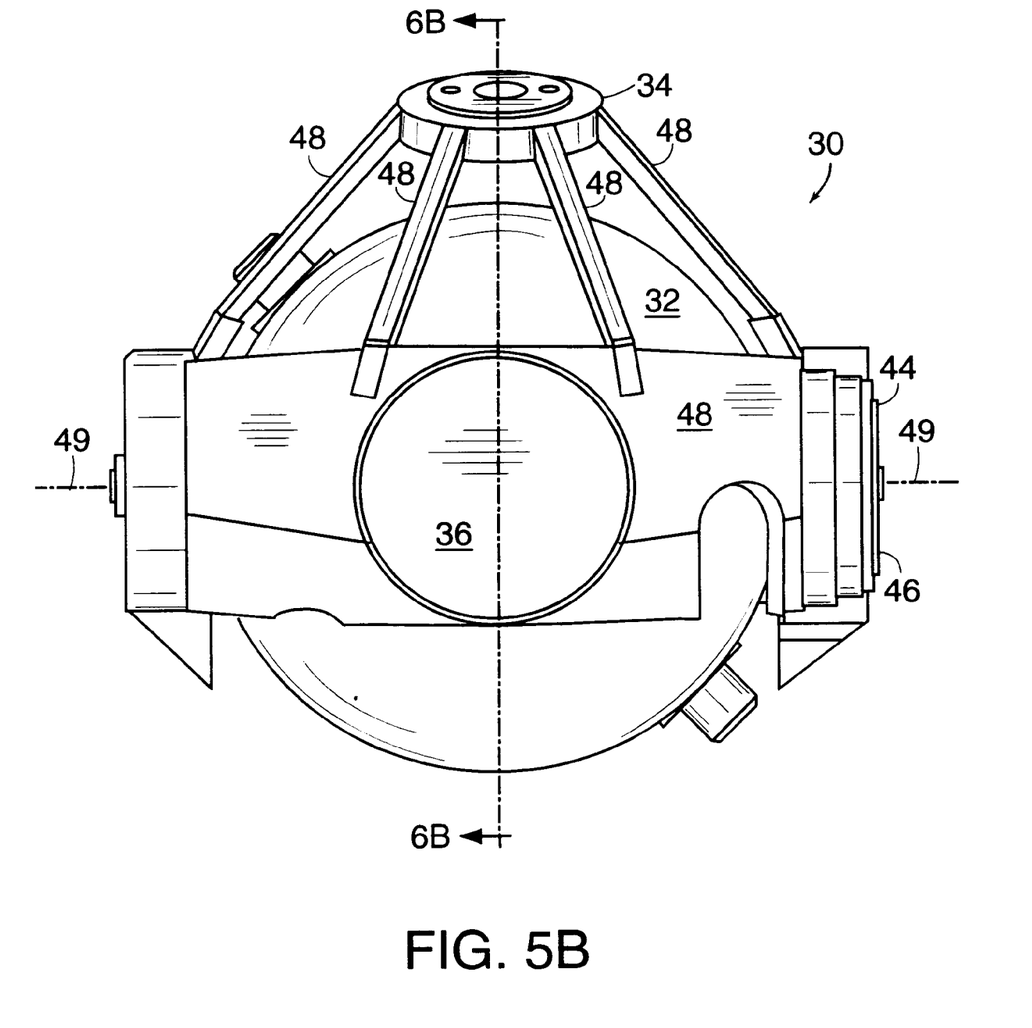
FIG. 5B is a simplified, front view sketch showing an optical system according to the invention when configured to provide a wide field of view.
Figure 6A:
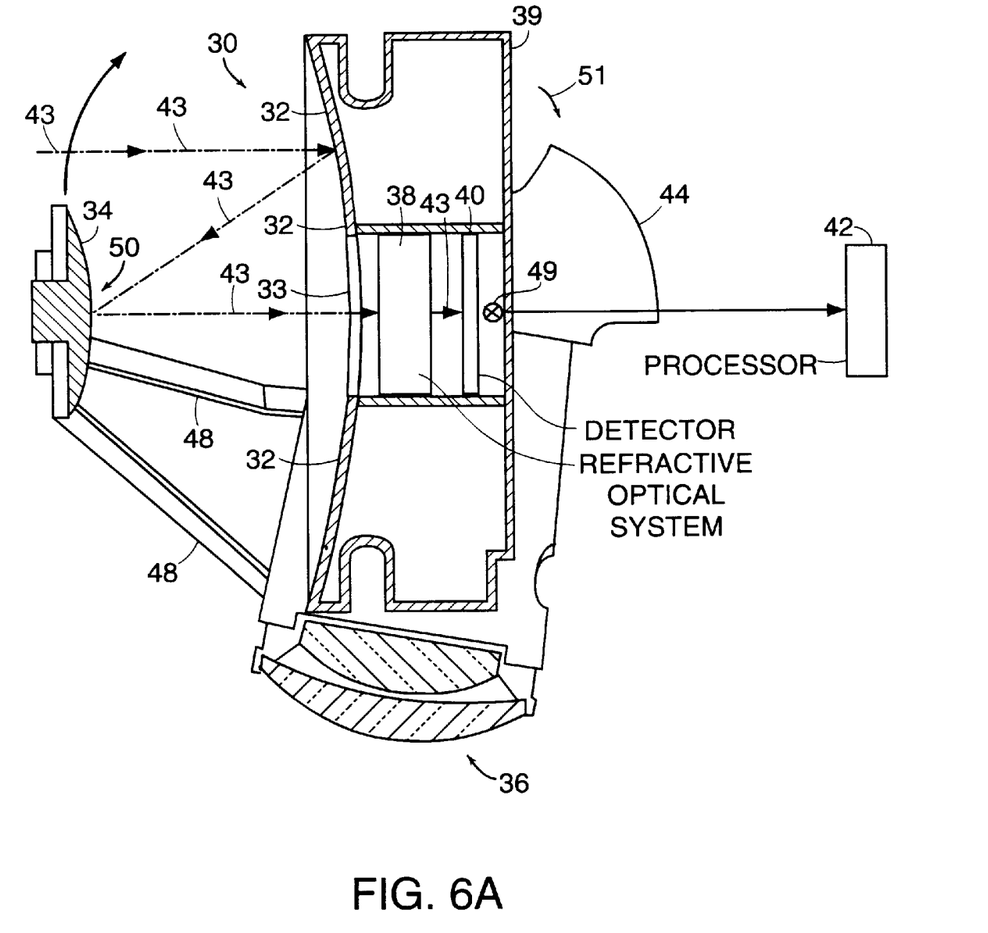
FIG. 6A is a simplified side, cross-sectional view of the optical system of FIG. 5A, such cross-section being taken along line 6A—6A in FIG. 5A.
Figure 6B:
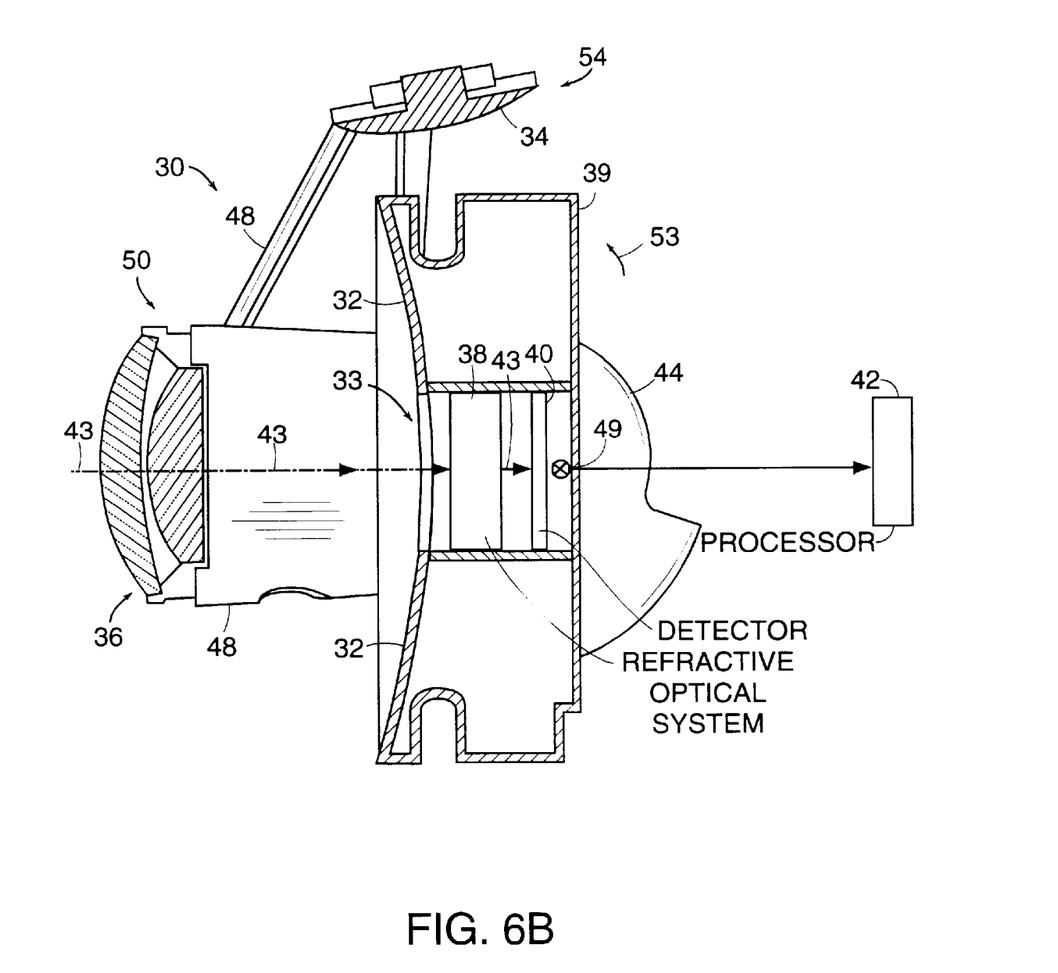
FIG. 6B is a simplified side, cross-sectional view of the optical system of FIG. 5B, such cross-section being taken along line 6B—6B in FIG. 5B.
Figure 7A:
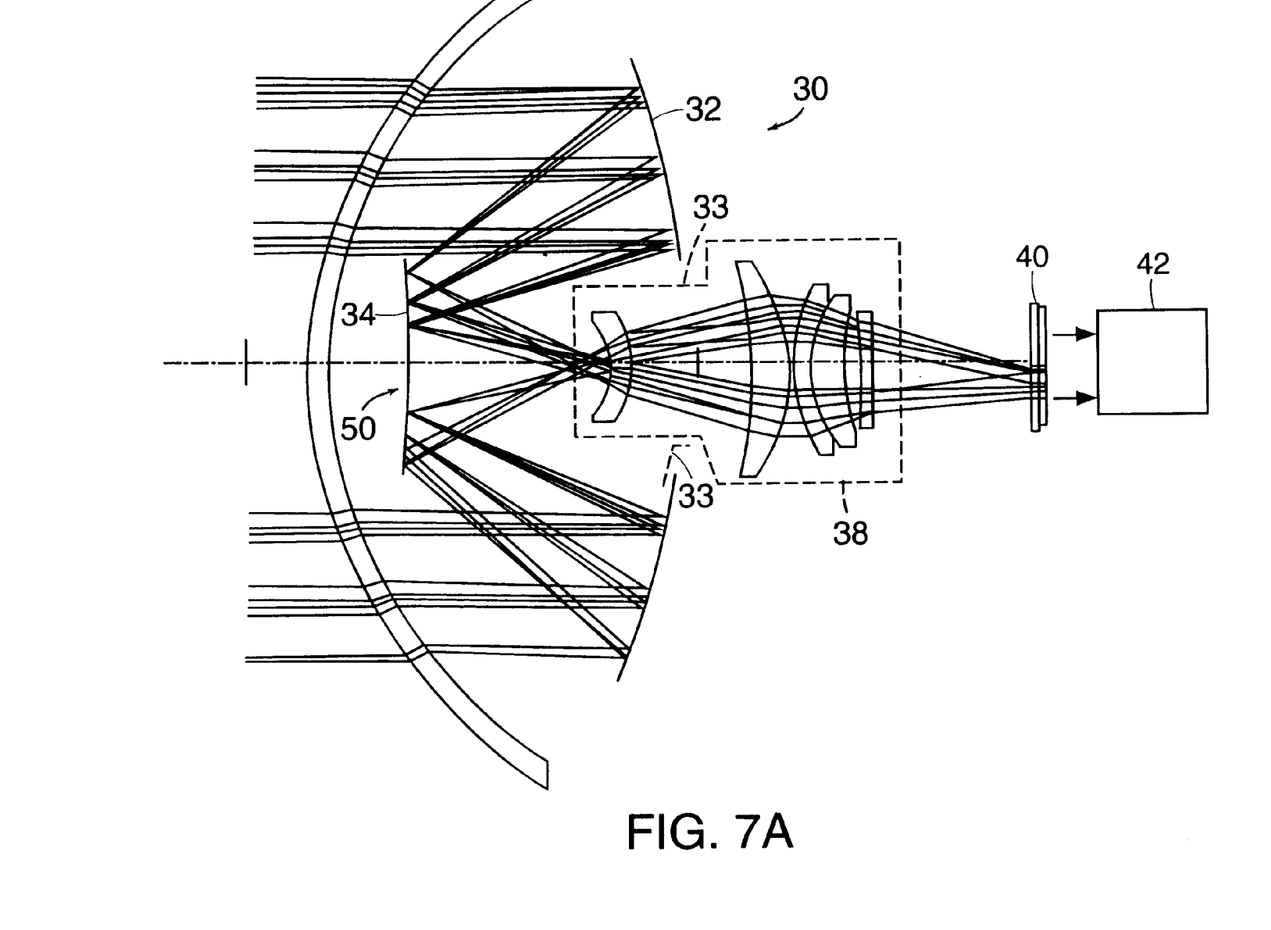
FIG. 7A is a diagrammatical sketch of a catadioptric optical system according to the invention when configured as shown in FIGS. 5A and 6A to provide a relatively narrow field of view with high resolution.
Figure 7B:
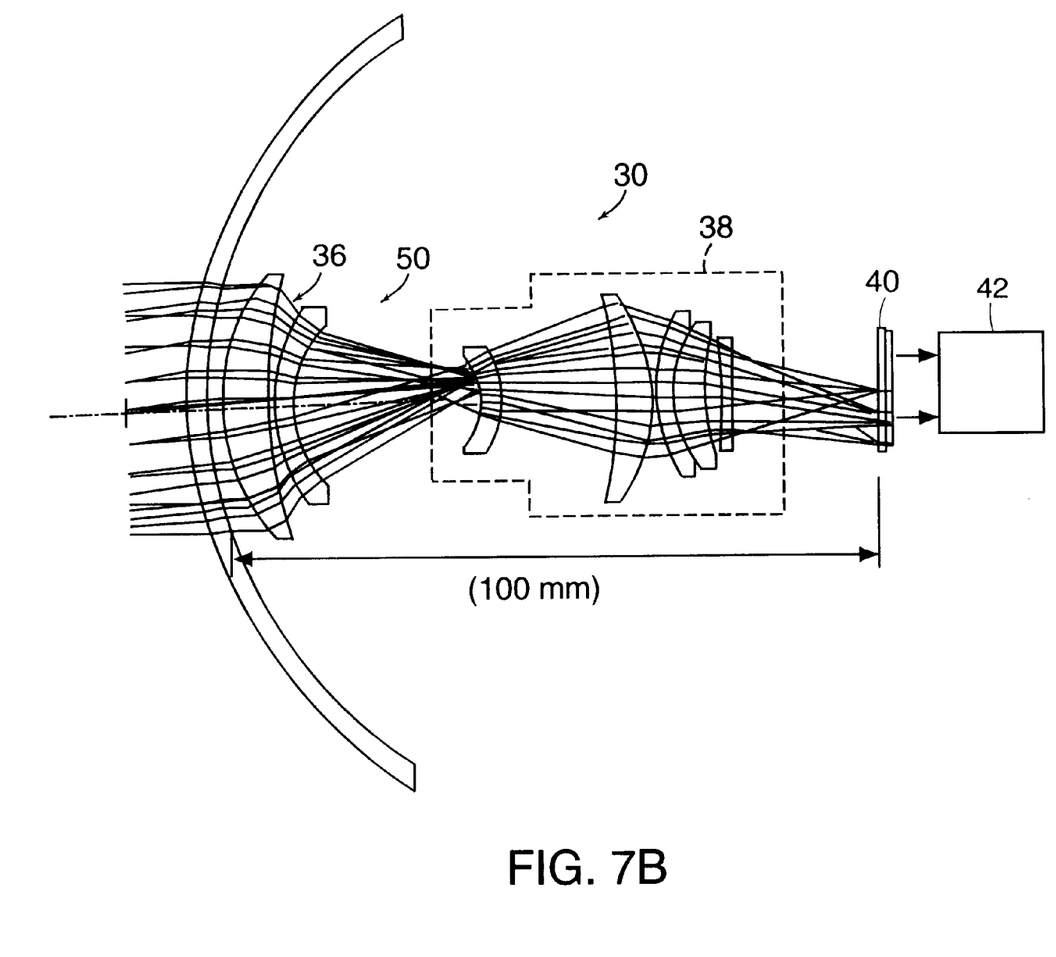
FIG. 7B is a diagrammatical sketch of a refractive optical system according to the invention when configured as shown in FIGS. 5B and 6B to provide a relatively wide field of view with the same f# as that provided by the optical system configured as in FIG. 7A.

Referring now to FIGS. 5A and 6A, an optical system 30 is shown when configured as a catadioptric optical system to provide a relatively narrow field of view with high resolution. Referring to FIG. 7A, a diagrammatical sketch is shown of the optical system 30 when configured as a catadioptric system, as shown in FIGS. 5A and 6A, to provide a relatively narrow field of view with high resolution. Referring now to FIGS. 5B and 6B, the optical system 30 is shown when configured as a refractive system to provide a relatively wide field of view with low resolution. Referring to FIG. 7B, a diagrammatical sketch is shown of the optical system 30 when configured as a refractive system to provide a relatively wide field of view with low resolution and with the same f# as that provided by the optical system configured as shown in FIGS. 5A, 6A and 7A. Thus, system 30 is adapted to have a selected one of the pair of fields of view by switching the optical system 30 from a catadioptric optical system, shown in FIGS. 5A, 6A and 7A, to a refractive optical system, shown in FIG. 5B, 6B and 7B.

More particularly, the optical system 30 includes: a primary reflector 32 having a central aperture 33; a secondary reflector 34, fed by the energy passing through the central aperture 33; a first refractive optical system 36; a second refractive system 38 (FIG. 6A); a detector 40; a processor 42 and a drive mechanism 44. It is noted that the second refractory system 38, and the detector are fixed relative to the primary reflector 32. More particularly, the second refractory system 38, and the detector are in fixed optical alignment with the central aperture 33. Thus, the motor 46 is fixed to the primary mirror 32 support housing 39 for the second refractory optical system 38 and the detector 40. The drive mechanism 44 includes a motor 46 and support structure 48 affixed to the secondary reflector 34 and the first refractive system 36 to orient the secondary reflector 34 to a first region 50 in optical alignment with the primary reflector 32. Thus, when so oriented, a Cassegrainian arranged reflective system is formed which, with the second refractive system 38, provides a catadioptric optical system 30 with the narrow field of view, as shown in FIGS. 5A, 6A and 7A. When motor 46 rotates structure 48 about axis 49 in the direction indicated by arrow 51 in FIG. 6A (i.e., clockwise), the drive mechanism 44 reorients the secondary reflector 34 to a second region 54 (FIGS. 5B and 6B) out of optical alignment with the primary reflector 32 and orients the refractive optical system 36 at the first region 50 to provide with the second refractive system 38 a refractive optical system 30 with a wide field of view, as shown diagrammatically in FIG. 7B. To switch back, the motor reverses direction, as shown by arrow 53 in FIG. 6B (i.e., counter-clockwise) to again orient the secondary reflector 34 in optical alignment with the primary reflector 32 and the second refractive optical system while displacing the first refractive optical system 36 from its previous optical alignment with the second refractive optical system 38.

That is, referring to FIGS. 5A, 6A, 5B and 6B, the secondary reflector 34 and the first refractive optical system 36 are mounted to a common support 48 which is gimballed about the primary reflector 32 by the motor 46. Thus, the drive mechanism 44 rotates the support 48 to orient, and reorient, the secondary reflector 34 and the first refractive optical system 36, as described above.

Figure 8A:
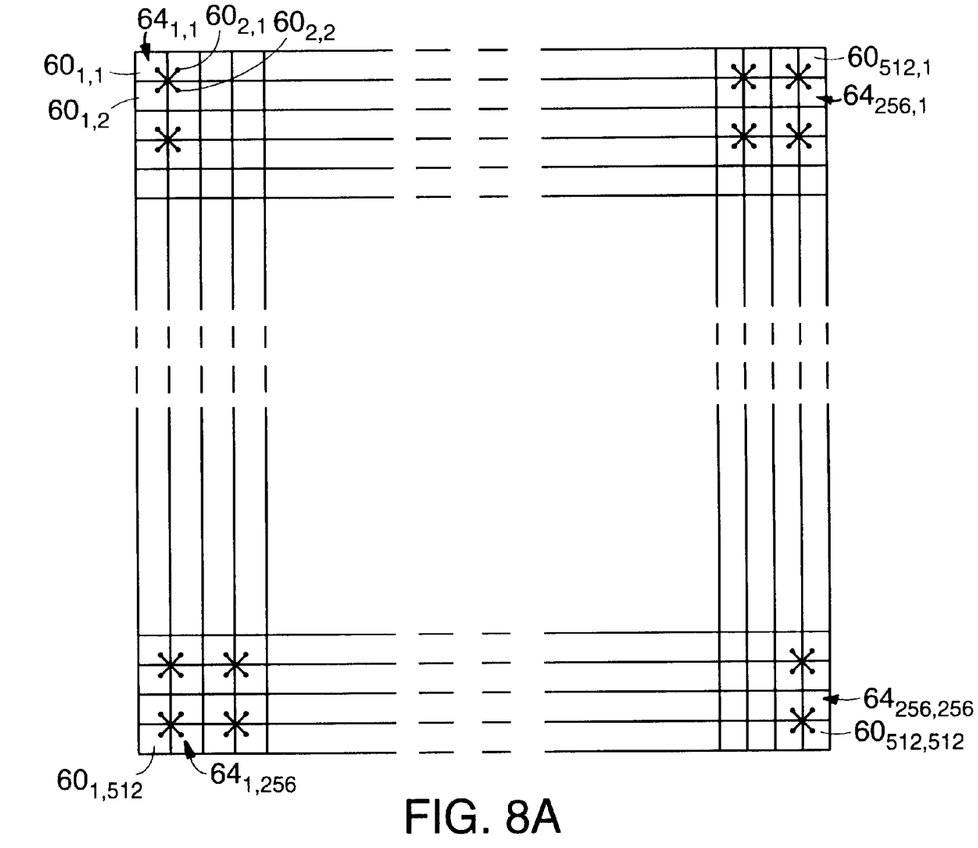
FIG. 8A is a simplified plane view of a focal plane array of detector elements used in the optical system according to the invention, such detector elements being shown schematically arranged to provide output signals for a processor fed by the output signals when the optical system is configured as shown in FIG. 7B to provide a relatively wide field of view and low resolution.
Figure 8B:
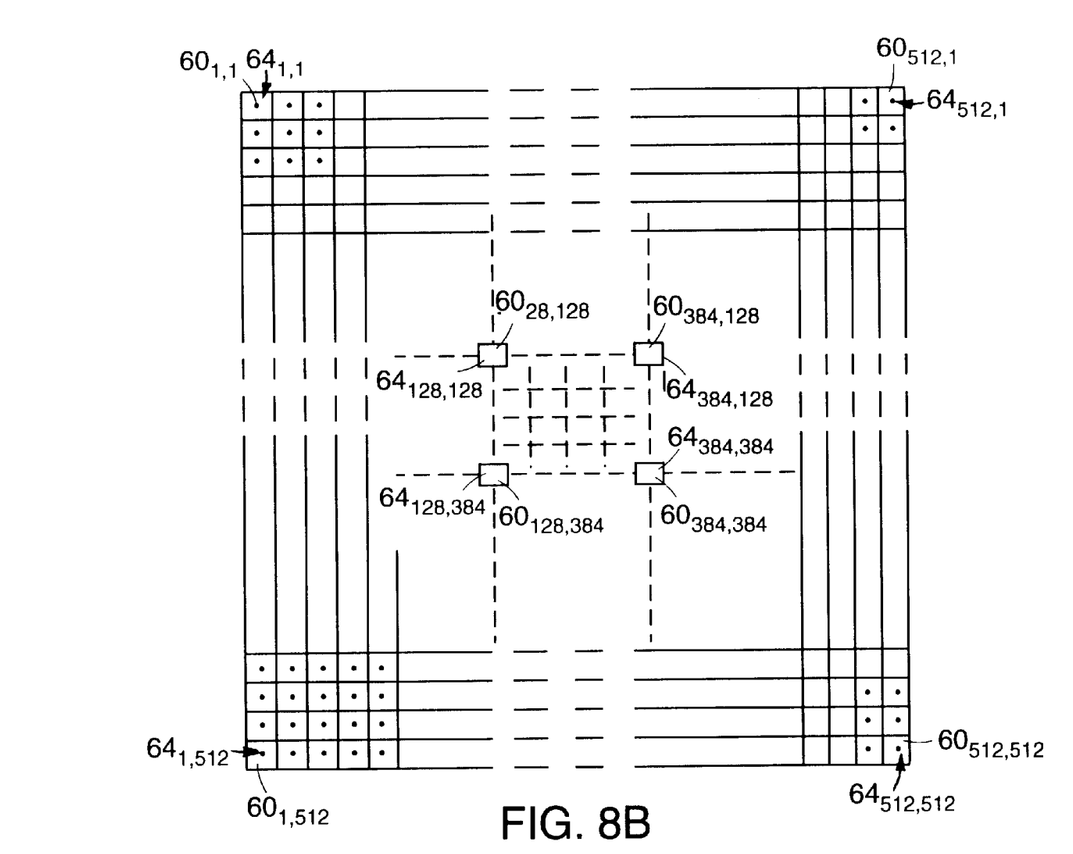
FIG. 8B is a simplified plane view of a focal plane array of detector elements used in the optical system according to the invention, such detector elements being shown schematically arranged to provide output signals for the processor fed by the output signals when the optical system is configured as shown in FIG. 7A to provide a relatively narrow field of view and high resolution.

As shown in FIGS. 6A, 6B, 7A and 7B, the second refractive optical system 38 is disposed between the first region 50 and the detector 40. The detector 40 comprises an array of detector elements 60, here infrared detector elements arranged in an array of here 512 by 512 rows and columns of detector elements $60_{1,1}$ through $60_{512,512}$, as shown in FIGS. 8A and 8B.

The optical system 30 includes processor 42 (FIGS. 6A, 6B, 7A and 7B) for processing energy indicated by arrow 43 directed through either the catadioptric optical system (i.e., primary reflector 32, secondary reflector 34, and the second refractive optical system 38, as shown in FIGS. 5A, 6A and 7A) or the refractive optical system (i.e., the first and second refractive optical systems 36, 38, as shown in FIGS. 5B, 6B and 7B), onto the plurality of detector elements $60_{1,1}$, $60_{512,512}$. It is noted that with the catadioptric optical system the energy 43 is reflected by the concave surface of the primary reflector 32 onto the convex surface of secondary reflector 34 then the energy 43 passes through the central aperture 33 then through the second refractive optical system 38 onto the detector 40, as shown in FIGS. 5A, 6A and 7A). With the refractive optical system, energy 43 passes through the first optical system 36, then through the central aperture 33 in the primary reflector 32 then through the second refractive optical system 38 onto the detector 40, as shown in FIGS. 5B, 6B and 7B).

The processor 42 processes energy from pixels 64 (i.e., pixels $64_{1,1}$–$64_{256, 256}$ in FIGS. 8A and pixels $64_{128,128}$–$64_{384, 384}$ in FIG. 8B) formed by plurality of detector elements $60_{1,1}$, $60_{512, 512}$ in a manner to be described. When the energy is directed through the catadioptric system (FIGS. 5A, 6A, 7A, the area of each pixel 64 processed by processor 42 is relatively small as shown in FIG. 8B. When the energy is directed through the refractive system (FIGS. 5B, 6B, 7B), the area of each pixel 64 processed by processor 42 is relatively large, as shown in FIG. 8A. More particularly, when the energy is directed through the refractive system (FIGS. 5B, 6B, 7B) the energy in four adjacent detector elements $60_{1,1}$, $60_{512,512}$ are averaged to form one pixel as shown in FIG. 8A (i.e., superpixeled). For example, the energy collected by detector elements $60_{1,1}$, $60_{1,2}$, $60_{2,1}$ and $60_{2,2}$ is averaged together to form pixel $64_{1,1}$. It follows then that an array of 256×256 pixels, $64_{1,1}$ through $64_{256,256}$ are processed by the processor 42 when the energy is directed through the refractive system shown in FIGS. 5B, 6B and 7B).

On the other hand, when the energy is directed through the catadioptric system (FIGS. 5A, 6A, 7A), each pixel 64 processed by processor 42 corresponds to one of the detector elements $60_{128,128}$, $60_{384,384}$. Therefore, an array of 256×256 pixels $64_{128,128}$–$64_{384,384}$ (FIG. 8B) made up of the centrally disposed, 256×256, array of detector elements, i.e., detector elements $60_{128,128}$–$60_{384,128}$ in row 128 through detector elements $60_{128,384}$–$60_{384,384}$ in row 384 is processed by the processor 42. More particularly, when the energy is directed through the catadioptric system (FIGS. 5A, 6A, 7A) the energy in each one of the detector elements $60_{128,128}$–$60_{384,384}$ provides one pixel $64_{128,128}$–$64_{384,384}$, as shown in FIG. 8B.

In this way, the optical system 30 with the array of detector elements $60_{1,1}$, $60_{512,512}$ and processor 42 switches between the catadioptric optical system (FIGS. 5A, 6A, 7A) and the refractive optical system (FIGS. 5B, 6B, 7B), to provide a four to one change in field of view each with 256×256 pixels.

Other embodiments are within the spirit and scope of the appended claims. For example, while a 4:1 ratio change in field of view has been described by a 2:1 ratio optical change (i.e., 200 mm catadioptric to 100 mm refractive) in conjunction with a 256×256 focal plane array region of interest non-summed (i.e., non-superpixeled) for the catadioptric system to a 512×512 focal plane array region of interest and summed (i.e., superpixeled), other ratio changes may also be used.

What is claimed is:

1. An optical system having a selected one of a pair of fields of view, comprising:

a primary reflector;

a secondary reflector;

a refractive optical system;

a drive for orienting the secondary reflector to a first region in optical alignment with the primary reflector to provide the optical system with one of the pair of fields of view and for reorienting the secondary reflector to a second region out of optical alignment with the primary reflector and orientating the refractive optical system at said first region to provide a refractive optical system with a second one of the pair of fields of view; and wherein the secondary reflector and the refractive optical system are mounted to a common support and wherein the drive rotates the support to orient and reorient the secondary reflector and the refractive optical system.

2. The optical system recited in claim 1 including a detector and a second refractive optical system disposed between said first region and the detector.

3. The optical system recited in claim 1 including a detector and wherein the detector comprises an array of detector elements and including a processor for processing energy from pixels formed by plurality of detector elements having a smaller area when the energy is directed through the secondary reflector than when the energy is directed through the refractive optical system.

4. The optical system recited in claim 3 including a second refractive optical system disposed between said first region and the detector.

5. An optical system having a selected one of a pair of fields of view, comprising:

a primary reflector;

a secondary reflector;

a refractive optical system;

a detector;

a drive for positioning the secondary reflector into optical alignment with the primary reflector and the detector for providing a catadioptric optical system with a first one of a plurality of fields of view and for repositioning the secondary reflector out of optical alignment with the primary reflector and positioning the refractive optical system into optical alignment with the detector for providing a refractive optical system with a second one of the plurality of fields of view; and wherein the secondary reflector and the refractive optical system are mounted to a common support and wherein the drive rotates the support to orientate and reorient the secondary reflector and the refractive optical system.

6. The optical system recited in claim 5 including a second refractive optical system disposed forward of the detector; and, wherein when the drive positions the secondary mirror into optical alignment with the primary mirror to provide the first field of view, the second refractive optical system is disposed between the secondary reflector and the detector, such primary reflector, secondary reflector and second refractive optical system providing a catadioptric optical system for the detector.

7. The optical system recited in claim 5 wherein the detector comprises an array of detector elements and including a processor for processing energy from pixels formed by plurality of detector elements having a smaller area when the energy is directed through the secondary reflector than when the energy is directed through the refractive optical system.

8. The optical system recited in claim 5 wherein the common support is mounted to rotate about the primary reflector.

\* \* \* \* \*